United States Patent
Fontanet et al.

(10) Patent No.: US 10,502,592 B2
(45) Date of Patent: Dec. 10, 2019

(54) DEVICE FOR THE MEASUREMENT OF THE ANGULAR POSITION OF A SHAFT, OR SIMILAR

(71) Applicants: Continental Automotive France, Toulouse (FR); Continental Automotive GmbH, Hannover (DE)

(72) Inventors: Alain Fontanet, Muret (FR); Jean-louis Roux, Brax (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/307,217

(22) PCT Filed: Jun. 2, 2017

(86) PCT No.: PCT/FR2017/051395
§ 371 (c)(1),
(2) Date: Dec. 5, 2018

(87) PCT Pub. No.: WO2017/212151
PCT Pub. Date: Dec. 14, 2017

(65) Prior Publication Data
US 2019/0234769 A1    Aug. 1, 2019

(30) Foreign Application Priority Data
Jun. 6, 2016 (FR) ...................... 16 55110

(51) Int. Cl.
*G01D 5/22* (2006.01)
(52) U.S. Cl.
CPC ................. *G01D 5/2291* (2013.01)

(58) Field of Classification Search
CPC .................................. G01D 5/2291
(Continued)

(56) References Cited

U.S. PATENT DOCUMENTS

2004/0017190 A1* 1/2004 McDearmon .......... G01D 5/145
                                                       324/207.25
2006/0208725 A1* 9/2006 Tapson ................ G01D 5/2291
                                                       324/207.17
2015/0204740 A1   7/2015 Fericean et al.

FOREIGN PATENT DOCUMENTS

EP    0182085 A2    5/1986
EP    0341412 A1   11/1989
(Continued)

OTHER PUBLICATIONS

International Search Report and Written Opinion for International Application No. PCT/FR2017/051395, dated Sep. 15, 2017—8 pages.
(Continued)

*Primary Examiner* — Reena Aurora
(74) *Attorney, Agent, or Firm* — RatnerPrestia

(57) ABSTRACT

A device for the measurement of the angular position of a shaft, having: a support upon which a primary winding and at least two secondary windings in mutual phase opposition are configured, to form a first inductive positional sensor, and a second positional sensor having at least two secondary windings in mutual phase opposition and arranged on the same support, opposite the secondary windings of the first positional sensor with respect to a median line, such that a motif is formed in each case on either side of the median line, wherein the primary winding encloses all the secondary windings. A unit having a device of this type and a target having two helixes of opposing pitches.

9 Claims, 4 Drawing Sheets

(58) Field of Classification Search
USPC .................................................. 324/207.18
See application file for complete search history.

(56)         References Cited

FOREIGN PATENT DOCUMENTS

FR         2170651 A5    9/1973
GB         1381560 A     1/1975

OTHER PUBLICATIONS

English translation of the Written Opinion for International Application No. PCT/FR2017/051395, dated Sep. 15, 2017, 5 pages.
Notice of Allowance for U.S. Appl. No. 16/307,274, dated Sep. 18, 2019, 12 pages.

* cited by examiner

DEVICE FOR THE MEASUREMENT OF THE ANGULAR POSITION OF A SHAFT, OR SIMILAR

CROSS REFERENCE TO RELATED APPLICATIONS

This application is the U.S. National Phase Application of PCT International Application No. PCT/FR2017/051395, filed Jun. 2, 2017, which claims priority to French Patent Application No. 1655110, filed Jun. 6, 2016, the contents of such applications being incorporated by reference herein.

FIELD OF THE INVENTION

The present invention relates to a device for the measurement of the angular position of a shaft, or similar, using inductive technology.

This technology has the advantage of permitting the determination of the position of a mechanical component, or of any other element, without the necessity for contact with the component, the position of which is to be detected. This advantage is such that applications of such sensors are very numerous, in all types of industries. Inductive sensors are also employed in general applications including, for example, the automobile sector, within which aspects of the present invention have been developed. However, aspects of this invention can also be employed in other diverse and varied fields.

BACKGROUND OF THE INVENTION

The operating principle of an inductive sensor is based upon the variation of coupling between a primary winding and the secondary windings of a transformer operating at high frequency, without the use of a magnetic circuit. The coupling between these windings varies according to the position of a movable (electrically) conductive component, generally described as a "target". Currents induced in the target modify the currents induced in the secondary windings. By the adaptation of the configuration of the windings, and knowing the current injected into the primary winding, measurement of the current induced in the secondary windings permit the determination of the position of the target.

Document EP0182085, incorporated herein by reference, describes the principle of an inductive sensor of this type.

For the integration of an inductive sensor of this type in a device, specifically an electronic device, the configuration of the aforementioned transformer on a printed circuit board is known. The primary winding and the secondary windings are thus constituted as tracks on the printed circuit board. The primary winding is then, for example, supplied by an external high-frequency power source, and the secondary windings are the site of currents induced by the magnetic field which is generated by the flow of current in the primary winding. The target, which is a conductive part, for example of metal construction, can assume a simple shape. For example, this part can comprise a cut-out from a metal sheet. For the execution of a linear sensor, the cut-out for the formation of the target may be, for example, of rectangular shape whereas, for a rotary sensor, said cut-out will assume, for example, the shape of an angular sector of radius and angle which are appropriate to the movement of the component.

Generally, two series of secondary windings are configured for the execution, over the full length of travel of the sensor, of sine and cosine functions for the position of the target. Such functions (sine and cosine) are well-known, and can easily be processed by an electronic system. By establishing the ratio of the sine to the cosine, then applying an arctangent function, an image of the position of the target is obtained. The argument of the sine and cosine functions is a linear (or affine) function of the position of the target, the travel of which thus represents a proportion, of varying magnitude, of the spatial period of these trigonometric functions.

In physical terms, modification of the coupling between the primary circuit and the secondary circuits is achieved by means of the electromagnetic skin effect, which will be familiar to a person skilled in the art. As the primary circuit is supplied by a high-frequency source, phenomena occurring throughout the sensor will be high-frequency phenomena. The target, the position of which is to be identified, is a solid conductive part, and is the site of substantial induced currents. The depth of penetration of these induced currents is relatively low (hence the name "skin effect"). For example, this depth is of the order of 50 µm, in the case of an aluminum target. Consequently, induction does not penetrate the target, and the magnetic flux generated by the primary circuit thus bypasses the target. As a result, the field lines are substantially modified. This modification is perceived by the secondary circuits which, depending upon the position of the target, receive an increased or reduced flux. These fluxes, which vary as a function of the position of the target, are also variable as a function of time, and thus generate a voltage at the terminals of the secondary circuits. By the measurement of these voltages, a signal is obtained which, further to analysis, permits the identification of the position of the target.

Where it is not possible to arrange a sensor at the end of a shaft, in order to determine the angular position of said shaft, the configuration of the shaft with a helix, which is arranged opposite a linear sensor, is known. In practice, where a helix is considered in rotation in relation to a fixed point, a surface in axial motion will be seen from said fixed point. Accordingly, the entire process proceeds as if the target were in linear motion, in opposition to the sensor.

A linear sensor can therefore provide an indication of the angular position of a shaft, by adapting the form of the target. However, where the shaft, the angular position of which is to be identified, moves axially, even in the event of stray movements, the angular measurement is distorted as a result of this angular movement.

SUMMARY OF THE INVENTION

An aspect of the present invention is therefore the execution of the measurement of the angular position of a shaft, or similar, using inductive (contactless) technology, in a radial position, i.e. from a position to the side of the shaft rather than at the end, whilst eliminating susceptibility to axial play.

Preferably, the device for the execution of this measurement will have a reduced footprint.

Advantageously, a device of this type will also permit the measurement of longitudinal displacement (along the axis of rotation of the shaft). This will permit, for example, the simultaneous measurement of an angular position and/or speed of rotation, and of axial displacement. Such a measurement of longitudinal displacement might also be employed for the quantification of a stray longitudinal movement.

To this end, an aspect of the present invention proposes a device for the measurement of the angular position of a shaft, or similar, comprising a support upon which, firstly, a primary winding, and secondly at least two secondary windings in mutual phase opposition are configured, to form a first inductive positional sensor.

According to an aspect of the present invention, the device comprises a second positional sensor having at least two secondary windings, in mutual phase opposition and arranged on the same support, opposite the secondary windings of the first positional sensor with respect to a median line, such that a motif is formed in each case on either side of said median line, wherein the primary winding is a primary winding which is common to the two positional sensors and encloses the secondary windings of the two positional sensors.

A device of this type is designed to operate with a double helix, having two helixes arranged side by side, wherein the two helixes are configured in opposing directions, and are mutually spaced. The two motifs defined above are separated such that, even if the shaft which carries the target in the form of a double helix is subject to longitudinal displacement (for example, stray vibrations), each motif can remain opposite a helix, without being influenced by the other.

The proposed device thus permits the acquisition of a signal which is solely dependent upon the angular position of the shaft which carries the target, with no susceptibility to any variation in longitudinal position, whether a stray variation or a deliberate variation. In practice, it is possible to eliminate flux variations associated with longitudinal displacements in the secondary windings of the proposed positional sensors.

In a first form of embodiment, the aforementioned measuring device is such that each motif is comprised of a first series of loops in a first winding, adjacent to a second series of loops in a second winding, wherein the loops of the first winding are of a similar form to the loops of the second winding, and the number of loops in the first series is equal to the number of loops in the second series.

In an alternative embodiment of the aforementioned measuring device, each motif is comprised of a first series of loops in a first winding, adjacent to a second series of loops in a second winding and to a third series of loops in the second winding, wherein the loops in the first winding have a surface area which is double that of the loops in the second winding, wherein the number of loops in the three series is equal, and the loops in the first series of loops are arranged between the loops of the second series of loops and those of the third series of loops, thereby forming a perpendicular alignment of loops to the median line.

An aspect of the present invention also relates to a unit formed by a device for the measurement of the angular position of a shaft and a target, which is noteworthy in that the device for the measurement of the angular position of a shaft is a device for the measurement of the angular position of a shaft of the type described above, in that the target comprises two helixes of opposing pitches, in that the first inductive positional sensor is arranged opposite one helix, and in that the second positional sensor is arranged opposite the other helix.

Finally, an aspect of the present invention relates to a method for the contactless measurement of the angular position of a shaft, which is noteworthy in that it comprises the following steps:

configuration on the exterior surface of the shaft of two helixes of opposing pitches, wherein the helixes are mutually spaced, within the range of angular measurement, at a predetermined distance which is a function of the estimated axial displacement of the shaft, the provision of a first inductive linear positional sensor, the provision of a second inductive linear positional sensor, the arrangement of the first positional sensor opposite a first helix, in order to deliver a signal which comprises, firstly, a representative component for the longitudinal displacement of the shaft and, secondly, a representative component for the rotation thereof, the arrangement of the second positional sensor opposite the second helix, in order to deliver a signal which comprises, firstly, a representative component for the longitudinal displacement of the shaft and, secondly, a representative component for the rotation thereof, the determination of the angular position of the shaft, by the combination of the signals delivered by the first positional sensor and by the second positional sensor, in order to eliminate components which are representative of the translation of the shaft.

In order to facilitate the deployment of this method, for example, it can be provided that:

the helixes are arranged on a cylindrical surface of the shaft, symmetrically in relation to a transverse plane in respect of said cylindrical surface and/or, the first positional sensor and the second positional sensor have a common primary winding.

Advantageously, a method of this type also permits the measurement of the axial displacement of the shaft, by the combination of signals delivered by the first positional sensor and by the second positional sensor, in order to eliminate components which are representative of the rotation of the shaft.

BRIEF DESCRIPTION OF THE DRAWINGS

Details and advantages of aspects of the present invention will be clarified by the following description, which refers to the schematic drawing attached, in which.

DETAILED DESCRIPTION OF THE PREFERRED EMBODIMENTS

Figure 1:
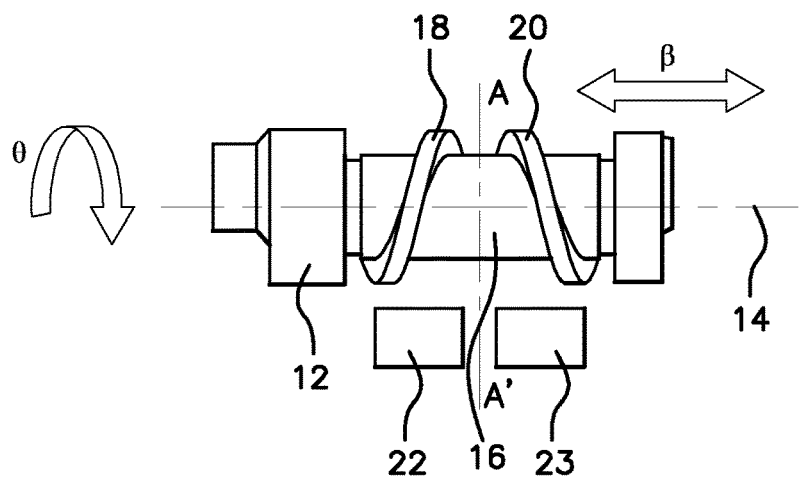
FIG. 1 shows a side view of a shaft on which a measurement of angular position (and, where applicable, of axial position) is to be executed.

FIG. 1 shows a shaft 12 having a longitudinal axis 14. This shaft 12 is driven in rotation, and its angular position is given by an angle θ. The shaft is susceptible to movement in lateral translation β, in the longitudinal direction corresponding to the longitudinal axis 14. The movement in translation may be a stray movement parasite (of the order of approximately one tenth of a millimeter) and/or deliberate movement.

This may be, for example, a camshaft of a motor vehicle. This shaft 12 has a cylindrical zone 16, on which a first helix 18 and a second helix 20 are configured. In the preferred form of embodiment illustrated here, these two helixes have the same characteristics, and are arranged symmetrically in relation to a transverse plane of the shaft 12. Accordingly, these two helixes have the same pitch, but are configured in opposing directions. It is assumed here that they surround the cylindrical zone 16 to an angle of 360°. It is assumed that the maximum lateral displacement of the shaft 12 along the longitudinal axis 14 is δ. The first helix 18 will then be spaced from the second helix 20 by a clearance at least equal to 26.

Figure 2:
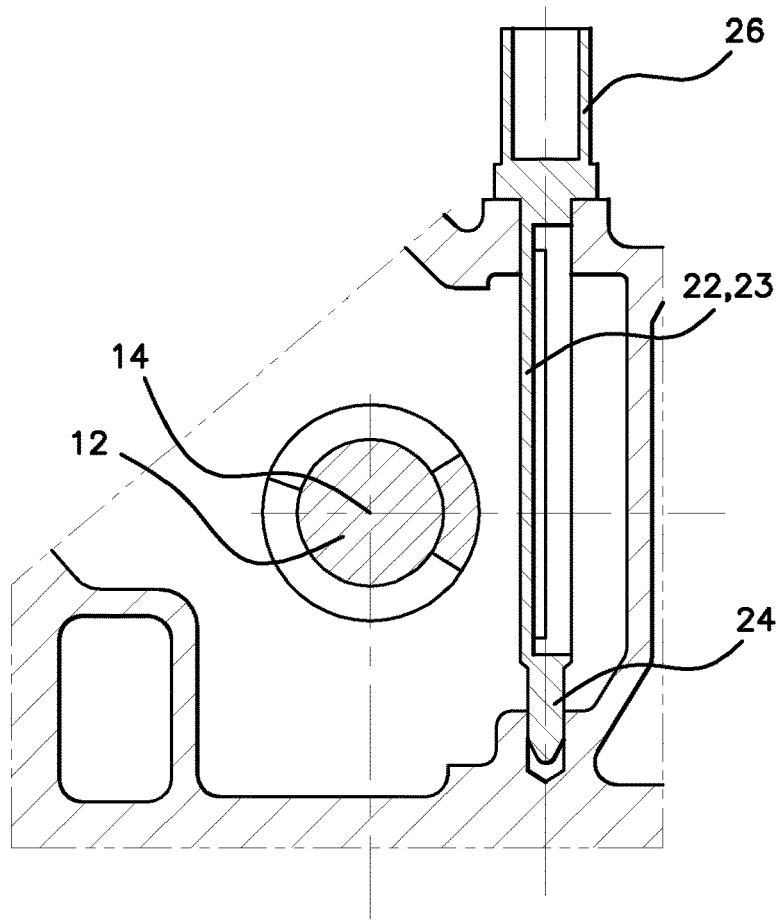
FIG. 2 shows a cross-sectional view of the shaft represented in FIG. 1, in which a contactless measuring system is illustrated.

The first helix 18 and the second helix 20 each cooperate with a first positional sensor 22 and a second positional sensor 23, both configured respectively on a single integrated circuit board, which is itself mounted on a support 24, associated with a connector 26. The first positional sensor 22 and the second positional sensor 23 are arranged in a parallel plane to the longitudinal axis 14 of the shaft 12, opposite the helixes and in proximity thereto, but not in contact with the latter. FIG. 2 shows a cross-sectional view, in relation to the shaft 12, of the position of the positional sensors in relation to the shaft. A clearance of the order of millimeters (between 0.5 and 5 mm) is maintained between the helixes and the positional sensors.

The first positional sensor 22 and the second positional sensor 23 are designed to determine the angular position of the shaft 12, and the position thereof along the longitudinal axis 14. Here, in order to determine the angular position (angle θ) of the shaft 12, linear positional sensors are used. Each helix translates rotational movement into a linear movement. When the shaft 12 rotates, each positional sensor perceives the corresponding helix as a target which undergoes linear displacement. One sensor perceives the displacement of the target in one direction, while the other sensor perceives the displacement of the target in the opposite direction.

Figure 3:
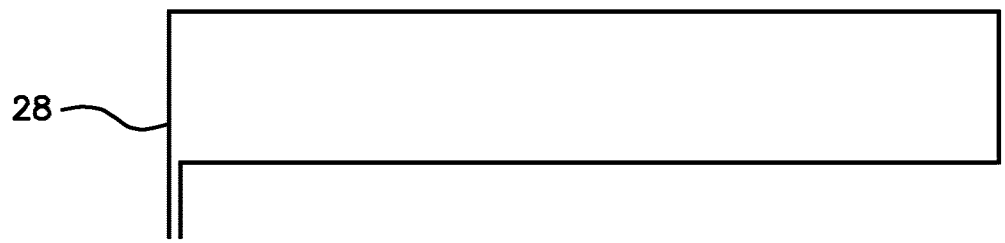
FIG. 3 shows a schematic illustration of a primary winding, which can be employed in the sensor illustrated in FIG. 2, FIGS. 4 and 5 show schematic illustrations of secondary windings, which can be employed in the measuring device illustrated in FIG. 2.
Figure 4:
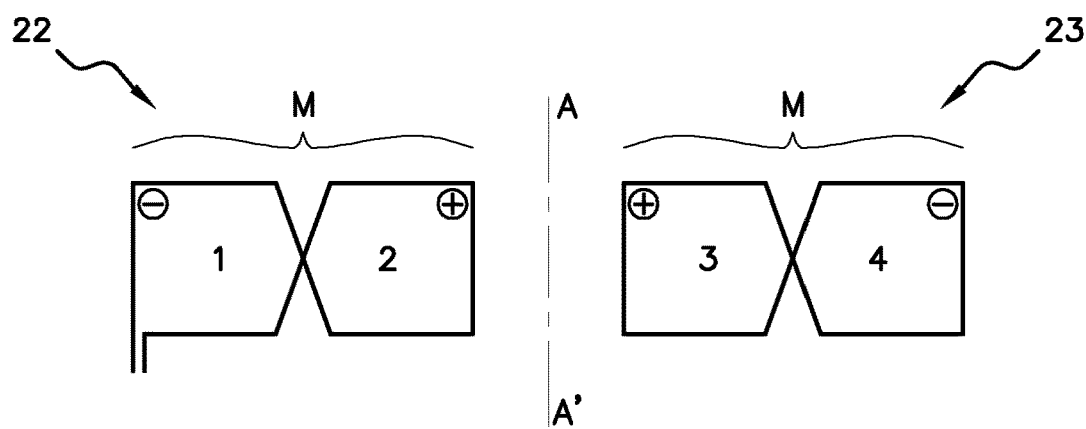
Figure 5:
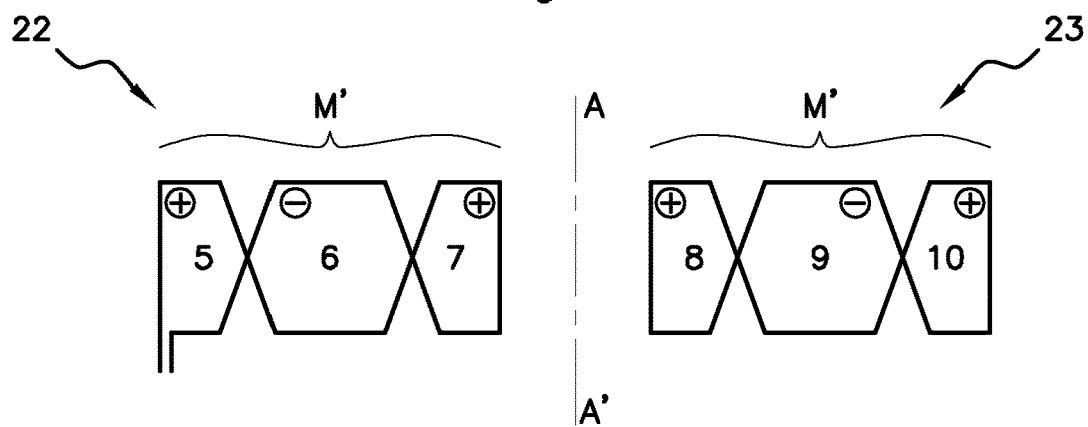

The first positional sensor 22 and the second positional sensor 23 are each configured as an inductive sensor, comprising one primary circuit 28 (FIG. 3) associated with a secondary circuit (FIG. 4 or FIG. 5). In a manner known to a person skilled in the art, the primary circuit 28 is excited by a high-frequency signal, and a target, in this case the helixes (the first helix 18 and the second helix 20), form a coupling with the corresponding secondary circuit. By measuring the electric voltage (signals) at the terminals of the secondary circuit, it is possible to identify the position of the helixes in relation to the first positional sensor 22 and the second positional sensor 23, and thus the angular position of the shaft 12. In an original manner, the primary circuit 28 is a common circuit to the first positional sensor 22 and the second positional sensor 23.

In the same way as the primary circuit, the secondary circuit of each of the positional sensors is printed on a board, also described as a PCB (printed circuit board). A first form of secondary circuit is illustrated in FIG. 4, and a variant of embodiment is illustrated in FIG. 5.

In the form of embodiment shown in FIG. 4, the secondary circuit of each positional sensor has two windings in mutual phase opposition. In FIG. 4, the presence of four loops, numbered from 1 to 4, will be observed. Loops 1 and 2 are associated with the first positional sensor 22, whereas loops 3 and 4 are associated with the second positional sensor 23. Each loop thus forms a secondary winding for the corresponding positional sensor.

The four loops 1, 2, 3 and 4 are aligned in a parallel axis to the longitudinal axis 14 of the shaft 12. These have substantially the same surface area, such that the flux induced by the primary circuit in each loop, in the absence of the target, has the same absolute value. The loops 1 and 2 of the first positional sensor 22 are designed for arrangement in opposition to the first helix 18, whereas the loops 3 and 4 of the second positional sensor 23 are designed for arrangement in opposition to the second helix 20. The loops 1 and 2 form a motif M, which is symmetrical to the motif M formed by loops 3 and 4, in relation to a median line AA'. In a given motif M (1 and 2 or 3 and 4), in each case, there is at least one loop which is in phase opposition with another loop in the same motif. The symbols + and − on FIGS. 4 and 5 are provided for illustrative purposes, in order to indicate which loops are in phase and which loops are in phase opposition.

It will also be observed that the two motifs M are separated. The separating distance between the two motifs (which, in FIG. 4, corresponds to the separating distance between loop 2 and loop 3) is the same as the separating distance between the first helix 18 and the second helix 20, for example 2δ.

FIG. 5 illustrates a variant of embodiment of the secondary circuit illustrated in FIG. 4. In this case, there are six loops, numbered from 5 to 10. The secondary circuit is formed of two series-connected windings, in mutual phase opposition. The loops 5, 7, on the one hand, and the loops 8 and 10, on the other, form a primary winding for the first positional sensor 22 and the second positional sensor 23 respectively: these are series-connected, and are in phase. The loops 6 and 9 each form a secondary winding which, in each case, is in phase opposition with the loops 5, 7 and 8, 10.

Here again, the loops of the secondary circuits are aligned in a parallel axis to the longitudinal axis 14 of the shaft 12. The loops 5, 6 and 7 form a first motif M' corresponding to the first positional sensor 22, which is symmetrical to a second motif M' corresponding to the second positional sensor 23 formed by the loops 8, 9 and 10. These two motifs M' are symmetrical in relation to a median line AA' and are mutually separated by a distance which, in this case, also corresponds to the separating distance between the first helix 18 and the second helix 20, for example 2δ.

In each of the motifs M', the surface area of the loops in one winding is equal to the surface area of the loops in the other winding. The first motif thus comprises the loops 5 and 7, each of which has a surface area which is substantially equal to one half of the surface area of the loop 6. Accordingly, the flux induced in the loops of a winding in a motif by the primary circuit is, expressed as an absolute value, equal to that induced by the primary circuit in the loops of the other winding.

The principle of measurement of the angular position θ of the shaft 12, using the positional sensors, is explained with reference to FIG. 6. In this figure, it is assumed that the positional sensors comprise the primary circuit 28 in FIG. 3, superimposed on the secondary circuits in FIG. 4.

Figure 6:
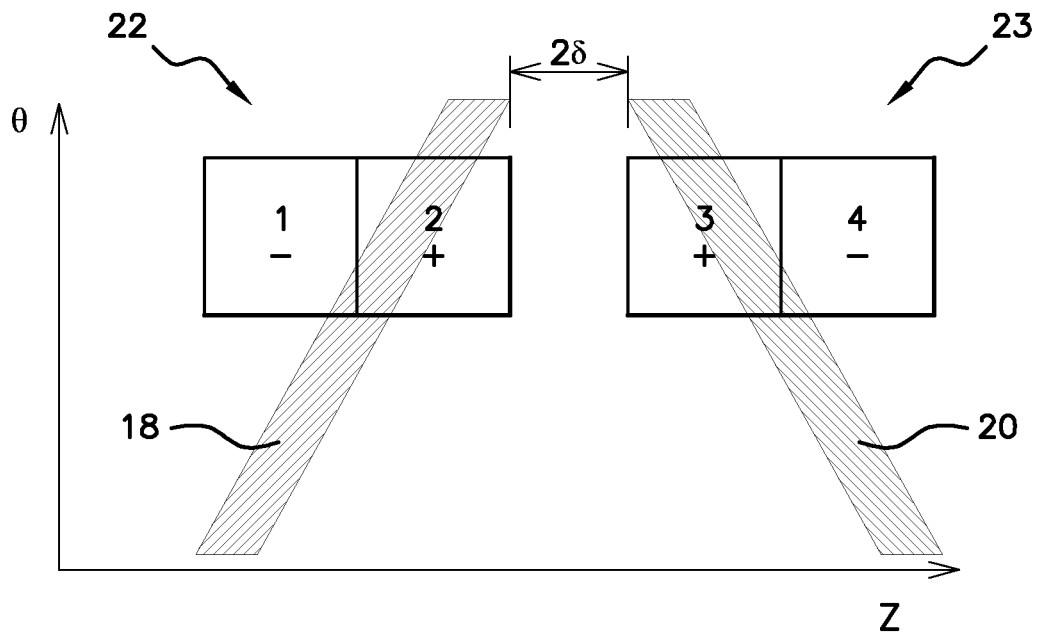
FIG. 6 shows a highly schematic illustration of the secondary windings arranged opposite a shaft, the angular position of which is to be measured within a given range (less than 360°)

In FIG. 6, which is a highly schematic figure, the first helix 18, the second helix 20, and the secondary circuits only of the two sensors in FIG. 4 are represented, with their associated four loops 1, 2, 3 and 4. This figure includes a representation of a y-axis Z, and an x-axis corresponding to the angular position θ. It is assumed that each secondary circuit (loops 1 and 2, and loops 3 and 4) is fixed. The helixes are each represented by an oblique strip: this corresponds to the image perceived by the sensors (secondary circuits) associated with the helixes when the shaft 12 rotates in front of them.

FIG. 6 corresponds to an angular position and an axial position of the shaft 12. If the shaft 12 rotates, the oblique strips representing the helixes will rise or descend along the x-axis represented in FIG. 6. If the shaft 12 moves axially, the oblique strips will move, in relation to the sensors, along the y-axis.

In the notional case represented in FIG. 6, it is assumed that the angular position is measured over a predetermined range, which is less than 360°.

When the shaft 12 rotates and θ increases, the free surface area of the loop 1 reduces. When the shaft 12 moves towards the rising values of Z, the free surface area of the loop 1 increases. Thus, φ1 is the flux induced in the loop 1. This flux will be inversely proportional to the angle θ and proportional to the longitudinal position Z. As the loop 1 is assumed to be in phase opposition with the primary circuit, a negative constant (−φ0) is selected for the determination of φ1.

This gives the following:

φ1=−φ0(−θ+Z)

The application of the same reasoning to the other loops gives the following:

φ2=φ0(θ−Z)

φ3=φ0(θ+Z)

φ4=−φ0(−θ−Z)

The signal measured at the terminals of the secondary circuit of the first positional sensor 22 will be proportional to the sum of the fluxes in the loops 1 and 2.

This gives the following:

Sensor flux 22=φ1+φ2

Sensor flux 22=φ0(θ−Z+θ−Z)

Sensor flux 22=2φ0(θ−Z)

The signal measured at the terminals of the secondary circuit of the second positional sensor 23 will be proportional to the sum of the fluxes in the loops 3 and 4.

This gives the following:

Sensor flux 23=φ3+φ4

Sensor flux 23=φ0(θ+Z+θ+Z)

Sensor flux 23=2φ0(θ+Z)

If the two signals are added together, this gives a signal which is representative of the sum of the fluxes in the four loops, namely:

Σφ=4φ0*θ

It therefore proceeds that, by the addition of the signals at the terminals of the secondary circuits, the resulting signal is proportional to the angular position of the shaft 12, and is insensitive to the axial displacement Z of the shaft 12.

A similar demonstration can be undertaken using the secondary circuit illustrated in FIG. 5. This gives the same result: the signal obtained by the addition of the signals measured at the terminals of the two secondary circuits of the two positional sensors is proportional to the angle of rotation of the shaft, and is insensitive to a variation in the axial position Z of said shaft 12.

In the above calculation, it has been assumed that, in each case, only a single loop 1, a single loop 2, a single loop 3 and a single loop 4 are present. In order to achieve greater sensitivity it is clear that, in each case, a number of loops can be superimposed in order to increase the induced flux, thereby achieving improved sensitivity.

It also proceeds from the above calculation that each helix should be simultaneously facing the two windings of a positional sensor at all times (1 and 2, 3 and 4 in the form of embodiment represented in FIGS. 4 and 6), in order to achieve the offsetting of the flux calculated heretofore in respect of a movement in translation. In this case, it is sufficient to adapt the geometry of the windings to that of the helixes. The size and position of the loops are adapted to the pitch of the helixes, their width, their position and their maximum displacement in translation within the range of measurement considered. Thus, each helix is located within an angular range of measurement simultaneously facing a first secondary winding and facing a second secondary winding which is in phase opposition to the first secondary winding.

Figure 7:
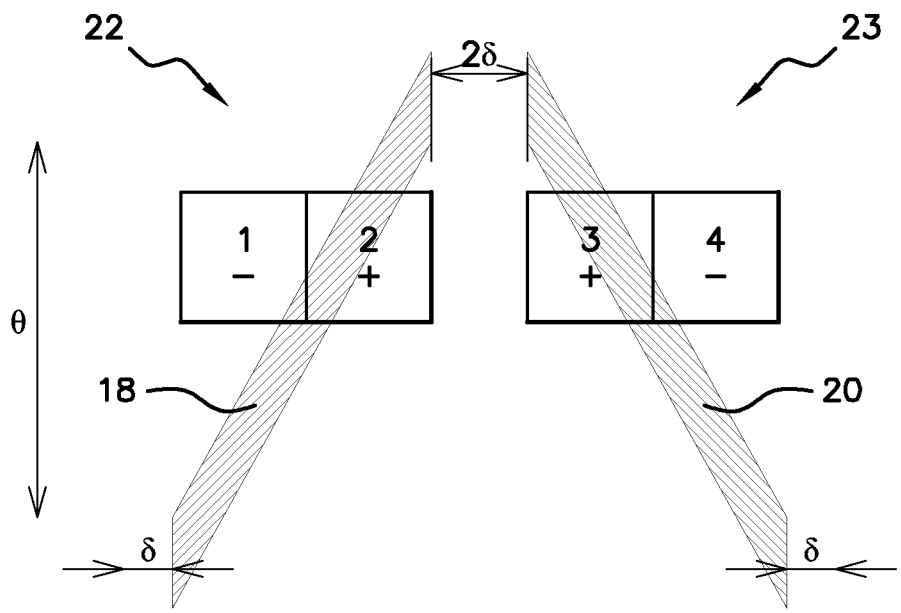
FIG. 7 shows a highly schematic illustration of the secondary windings arranged opposite a shaft, the angular position of which is to be measured over a range of 360°.

FIG. 7 illustrates a measurement of angular position through 360°. The principle of measurement remains the same. The shape of the ends of the helixes is adapted such that the variation in the induced flux remains the same for a given angular variation throughout the entire range of measurement, i.e. 360°. In this case, it is therefore provided that the helixes encompass the shaft 12 to an angle of 360°, and that the ends of the helixes are situated in a radial plane in relation to the shaft 12. It should also be ensured that the cylindrical zone 16 features no projections, or similar, which form a target at a lower distance than δ from the ends of the helixes.

Figure 8:
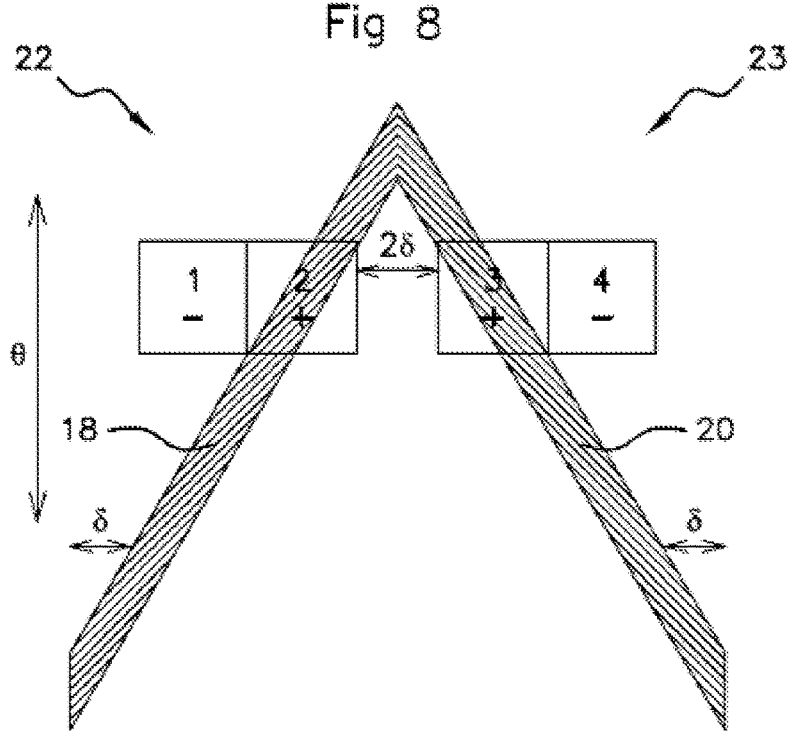
FIGS. 8 and 9 show similar views to FIGS. 6 and 7, for variants of embodiment of the shaft upon which the measurement of angular position is to be executed.
Figure 9:
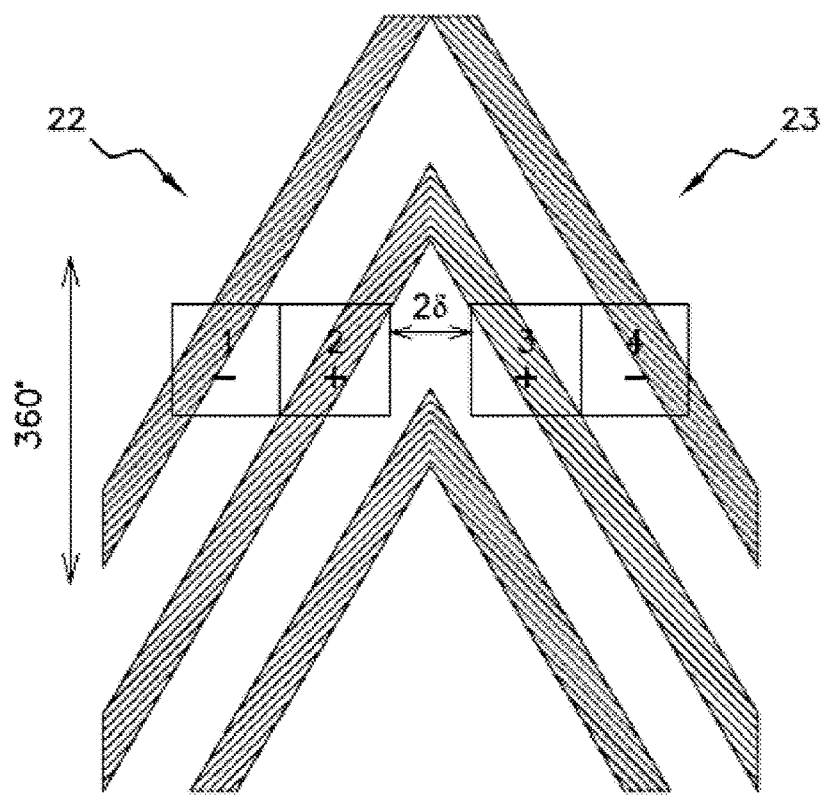

As illustrated in FIG. 8, it is possible for the helixes to be joined to form a chevron. Where a measurement is executed for a number of poles, for example on the shaft of a multi-pole motor, it is possible to arrange a plurality of helixes or chevrons at the level of the cylindrical zone 16 provided for positional measurement.

Transverse displacement along the longitudinal axis 14 of the shaft 12 may be a stray movement. However, it may also be a deliberate movement, in which case it is also useful to be able to measure the displacement of the shaft 12 along its longitudinal axis.

Due to the presence of two helixes, arranged in opposing directions, it is also possible to measure the longitudinal displacement of the shaft 12. To this end, it is sufficient to subtract the two signals delivered by the positional sensors. In the example described above, it is appropriate to consider the signal from the second positional sensor 23, and to subtract therefrom the signal delivered by the first positional sensor 22. In consideration of the above example, this gives the following:

Sensor flux 23−Sensor flux 22=2φ0(θ+Z)−2φ0(θ−Z)

Sensor flux 23−Sensor flux 22=4φ0*Z

The signal obtained by the subtraction of the two signals delivered by the positional sensors is therefore representative of the axial displacement Z of the shaft 12.

The above-mentioned form of embodiment thus permits the simultaneous measurement of the angular position of a shaft, without being influenced by the axial position of the latter, while also permitting the measurement of the axial position of said shaft. Thus, a single positional sensor permits the execution of two positional measurements (angular and longitudinal). A double measurement of this type using a single sensor had not been achieved according to the knowledge of inventors at the time of filing of the patent application.

The proposed positional sensor (angular and/or longitudinal) has a reduced footprint. It can also be employed in the execution of an angular speed sensor for a shaft (also described as a "resolver").

In the preferred form of embodiment proposed, targets are configured in the form of helixes, wherein the two helixes have the same pitch, but are configured in opposing directions. The use of two helixes of different pitches might be envisaged, with the corresponding adaptation of the loops of the positional sensors.

The forms of embodiment illustrated also provide for a symmetrical arrangement of sensors. Although this is a preferred form of embodiment, other forms of embodiment are conceivable. For example, in the form of embodiment shown in FIGS. 4 and 6-9, loop 1 is in phase with loop 4, and loop 2 is in phase with loop 3. Loop 1 could equally well be in phase with loop 3, and loop 2 in phase with loop 4. In the latter case, by the addition of the signals delivered by the two positional sensors, a signal which is representative of the translation of the shaft 12 would be obtained, whereas the subtraction of these signals would deliver a signal which is representative of the angle of rotation of the shaft 12.

Aspects of the present invention are thus not limited to the preferred form of embodiment described heretofore and illustrated in the figures, but also includes numerous variants whether mentioned or otherwise, which can be inferred from the present document by a person skilled in the art.

The invention claimed is:

1. A unit formed by a device for the measurement of the angular position of a shaft and a target, wherein the device for the measurement of the angular position of a shaft is a device for the measurement of the angular position of a shaft comprising a support upon which, firstly, a primary winding, and secondly at least two secondary windings in mutual phase opposition are configured, to form a first inductive positional sensor, wherein
    the device comprises a second positional sensor having at least two secondary windings, in mutual phase opposition and arranged on the same support, opposite the secondary windings of the first inductive positional sensor with respect to a median line such that a motif is formed in each case on either side of said median line, wherein the primary winding encloses the secondary windings of the first inductive positional sensor and the second positional sensor,
    the target comprises two helixes of opposing pitches,
    the first inductive positional sensor is arranged opposite a helix, and
    the second positional sensor is arranged opposite the other helix.

2. The unit as claimed in claim 1, wherein each motif is comprised of a first series of loops in a first winding, adjacent to a second series of loops in a second winding, wherein the loops of the first winding are of a similar form to the loops of the second winding, and the number of loops in the first series is equal to the number of loops in the second series.

3. The unit as claimed in claim 2, wherein the helixes are arranged on a cylindrical surface of the shaft, symmetrically in relation to a transverse plane in respect of said cylindrical surface.

4. The unit as claimed in claim 1, wherein each motif is comprised of a first series of loops in a first winding, adjacent to a second series of loops in a second winding and to a third series of loops in the second winding, wherein the loops in the first winding have a surface area which is double that of the loops in the second winding, wherein the number of loops in the three series is equal, and the loops in the first series of loops are arranged between the loops of the second series of loops and those of the third series of loops, thereby forming a perpendicular alignment of loops to the median line.

5. The unit as claimed in claim 4, wherein the helixes are arranged on a cylindrical surface of the shaft, symmetrically in relation to a transverse plane in respect of said cylindrical surface.

6. The unit as claimed in claim 1, wherein the helixes are arranged on a cylindrical surface of the shaft, symmetrically in relation to a transverse plane in respect of said cylindrical surface.

7. The unit as claimed in claim 1, wherein the first inductive positional sensor and the second positional sensor have a common primary winding.

8. A method for contactless measurement of an angular position of a shaft, using a device for the measurement of the angular position of a shaft and a target, wherein said device for the measurement of the angular position of the shaft comprises a support upon which, firstly, a primary winding, and secondly at least two secondary windings in mutual phase opposition are configured, to form a first inductive positional sensor, comprising:
    configuring, on the exterior surface of the shaft, two helixes of opposing pitches, wherein the helixes are mutually spaced, within the range of angular measurement, at a predetermined distance which is a function of an estimated axial displacement of the shaft,
    providing the first inductive linear positional sensor,
    providing a second inductive linear positional sensor, wherein said second inductive positional sensor has at least two secondary windings in mutual phase opposition and arranged on the same support, opposite the secondary windings of the first inductive positional sensor with respect to a median line such that a motif is formed in each case on either side of said median line, wherein the primary winding encloses the secondary windings of the first inductive positional sensor and the second inductive positional sensor,
    arranging the first inductive positional sensor opposite a first helix, in order to deliver a signal which comprises, firstly, a representative component for longitudinal displacement of the shaft and, secondly, a representative component for the rotation thereof,
    arranging the second inductive positional sensor opposite the second helix, in order to deliver a signal which comprises, firstly, a representative component for the longitudinal displacement of the shaft and, secondly, a representative component for the rotation thereof, and
    determining the angular position of the shaft by a combination of signals delivered by the first positional sensor and by the second positional sensor in order to eliminate components which are representative of the translation of the shaft.

9. The method as claimed in claim 8, further comprising measuring of the axial displacement of the shaft, by the combination of the signals delivered by the first inductive position sensor and by the second inductive positional sensor, in order to eliminate components which are representative of the rotation of the shaft.

* * * * *